United States Patent
Pong et al.

(10) Patent No.: US 6,874,065 B1
(45) Date of Patent: Mar. 29, 2005

(54) CACHE-FLUSHING ENGINE FOR DISTRIBUTED SHARED MEMORY MULTI-PROCESSOR COMPUTER SYSTEMS

(75) Inventors: Fong Pong, Mountain View, CA (US); Lance Russell, Hollister, CA (US); Tung Nguyen, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/258,549

(22) Filed: Feb. 26, 1999

(51) Int. Cl.[7] ............................................. G06F 12/00
(52) U.S. Cl. ...................... 711/135; 711/141; 711/147
(58) Field of Search ................................. 711/135, 156, 711/141, 159, 133, 147, 143

(56) References Cited

U.S. PATENT DOCUMENTS

| | | | | |
|---|---|---|---|---|
| 5,432,918 A | * | 7/1995 | Stamm | ........................ 711/156 |
| 6,021,473 A | * | 2/2000 | Davis et al. | ................. 711/141 |
| 6,049,857 A | * | 4/2000 | Watkins | ....................... 711/207 |
| 6,105,112 A | * | 8/2000 | Arimilli et al. | .............. 711/141 |

OTHER PUBLICATIONS

"Computer Organization and Design", Second Edition, Edited by John L. Hennessy & David A. Patterson publish in 1998 by Morgan Kaufmann Publisher, Inc. p. 614–615.*

* cited by examiner

*Primary Examiner*—Mano Padmanabkan
*Assistant Examiner*—Jasmine Song

(57) ABSTRACT

A cache coherent distributed shared memory multi-processor computer system is provided with a cache-flushing engine which allows selective forced write-backs of dirty cache lines to the home memory. After a request is posted in the cache-flushing engine, a "flush" command is issued which forces the owner cache to write-back the dirty cache line to be flushed. Subsequently, a "flush request" is issued to the home memory of the memory block. The home node will acknowledge when the home memory is successfully updated. The cache-flushing engine operation will be interrupted when all flush requests are complete.

16 Claims, 2 Drawing Sheets

CACHE-FLUSHING ENGINE FOR DISTRIBUTED SHARED MEMORY MULTI-PROCESSOR COMPUTER SYSTEMS

CROSS-REFERENCE TO RELATED APPLICATIONS

The present application contains subject matter related to a pending U.S. patent application Ser. No. 09/258,608 entitled "Transactional Memory for Distributed Shared Memory Multi-processor Computer Systems" by F. Pong, L. Russell, and T. Nguyen. This application is being filed contemporaneously herewith, and is hereby incorporated by reference.

TECHNICAL FIELD

The present invention relates generally to multi-processor computer systems and more particularly to system control units.

BACKGROUND ART

High performance, multi-processor computer systems with a large number of microprocessors are built by interconnecting a number of node structures, each node containing a subset of the processors and memory in the system. While the memory in the system is distributed, several of these systems support a shared memory abstraction where all the memory in the system appears as a large memory common to all processors in the system. To support high-performance, these systems typically allow processors to maintain copies of memory data in their local caches. Since multiple processors can cache the same data, these systems must incorporate a cache coherence mechanism to keep the copies coherent.

In some cache-coherent systems, each memory block (typically a portion of memory tens of bytes in size) is assigned a "home node", which maintains all necessary global information for that memory block, manages the sharing of that memory block, and guarantees its coherence. The home node maintains a directory, which identifies the nodes that possess a copy of the memory block. When a node requires a copy of the memory block, it requests the memory block from its local, private cache. If the data is found, the memory access is resolved locally. Otherwise, a remote memory access is performed to the home node. The home node supplies the data from memory if its memory has the latest data. If another node has the latest copy of the data, the home node directs this node to forward the data to the requesting node. The data is then stored in the local cache of the requesting node.

In cache-coherent systems, multiple copies of the same memory block can exist in different nodes. These copies must be read-only and identical to the home memory copy. They are called "clean" copies in a "shared" state.

When a processor updates its local cache copy, it must ensure that all other copies are invalidated. Consequently, the processor has an "exclusive" and "modified" data copy, which hold the most recent value of the data. The other copies of the memory block are "stale". The updating processor then becomes the "owner" of the memory block.

The home node employs a coherence protocol to ensure that when a node writes a new value to the memory block, all other nodes see this latest value. Coherence controllers implement this coherence functionality. First, they implement a coherence controller for each memory unit, which maintains coherence of all memory blocks in that memory unit. Second, the functionality of the coherence controller is integrated with the functionality of the System Control Unit (SCU) of the associated memory unit.

The SCU provides the control and the path for data movement for the following sources and destinations within the node: the processors within the node; the local (node) portion of the memory system; the network connecting all of the nodes of the multi-processor computer system; and the input/output (I/O) system of the local node.

However, a serious problem in the state-of-art cache-coherent shared-memory multiprocessor system designs is that the memory copy is stale after the crash of the owner node. In other words, the most recent value of a memory block is lost when the cache content is irretrievable at a failed owner node.

In many situations, the software may demand a selective cache-flushing scheme in order to define a synchronization point, at which the most recent value of a memory block is reflected at the home memory by flushing the owner cache.

In today's processor designs, cache flushing is normally implemented as an expensive operation, which may result in wiping out the entire cache rather than the desired cache blocks alone. Although some processors provide selective cache-flushing instructions, there is no guarantee of the correctness unless the cache flushing instruction has a system-wide semantics, which is prohibitively expensive.

Thus, a system has been long sought and long eluded those skilled in the art, which would provide an efficient implementation of transactional memory.

DISCLOSURE OF THE INVENTION

The present invention provides a cache coherent distributed shared memory multi-processor computer system with selective cache flushing. After a request is posted in a cache-flushing engine, a "flush" command is issued which forces the owner cache to write-back the dirty cache line, which contains stale data, to be flushed. Subsequently, a "flush request" is issued to the home memory of the memory block. The home node will acknowledge when the home memory is successfully updated. The cache-flushing engine operation will be interrupted when all flush requests are complete.

The present invention also provides a cache coherent distributed shared memory multi-processor computer system with programmable selective cache flushing.

The present invention further provides a cache coherent distributed shared memory multi-processor computer system which allows programmers to selectively force write-backs of dirty cache lines to home memory.

The above and additional advantages of the present invention will become apparent to those skilled in the art from a reading of the following detailed description when taken in conjunction with the accompanying drawings.

BEST MODES FOR CARRYING OUT THE INVENTION

Figure 1:
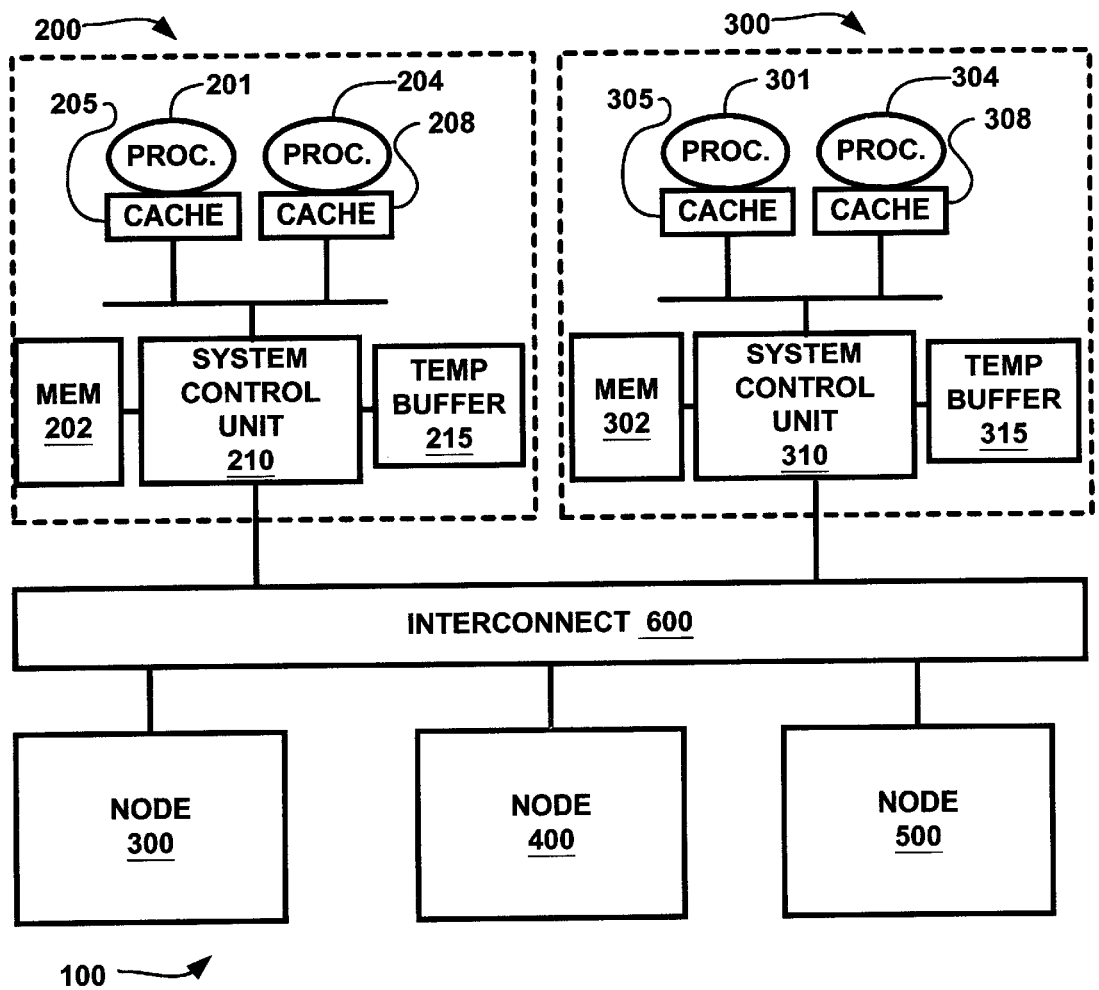
FIG. 1 is a cache coherent Distributed Shared Memory (DSM) multiprocessor computer system according to the present invention.

Referring now to FIG. 1, therein is shown a cache coherent Distributed Shared Memory (ccDSM) multiprocessor computer system 100. It should be understood that the system shown is for illustrative purposes only since the present invention is applicable to all architecture designs with caches. The multi-processor computer system 100 has a plurality of nodes of which the nodes 200, 300, and 400 through 500 (with only the first and last nodes shown for nodes 400 through 500). The nodes 200, etc. are operatively connected to an interconnect 600, which is part of an interconnection network which includes crossbar switches and links as are well known to those skilled in the art.

Each node contains a plurality of processors and caches. For example, the node 200 contains processors 201 through 204 (with only the first and last processors shown) and respective caches 205 through 208 (with only the first and last processors shown). The caches are operatively connected to a System Control Unit (SCU) 210. The SCU 210 is operatively connected to a memory 202 and a temporary buffer 215. The SCU 210 provides the control and the path for data movement for various sources and destinations within the node 200. The sources and destinations include: the processors 201 through 204 within the node; the local node memory 202; the interconnect 600; and the input/output (I/O) system of the local node (not shown). The SCU 210 further contains a cache-flushing engine (CFE) 220.

Similarly, the node 300 contains processors 301 through 304 (with only the first and last processors shown) and respective caches 305 through 308 (with only the first and last processors shown). The caches are operatively connected to a System Control Unit (SCU) 310. The SCU 310 is operatively connected to a memory 302 and a temporary buffer 315. The SCU 310 provides the control and the path for data movement for various sources and destinations within the node 300. The SCU 310 further contains a cache-flushing engine (CFE) 320.

The other nodes 400, 500, etc. are the same as the nodes 200 and 300.

Figure 2:
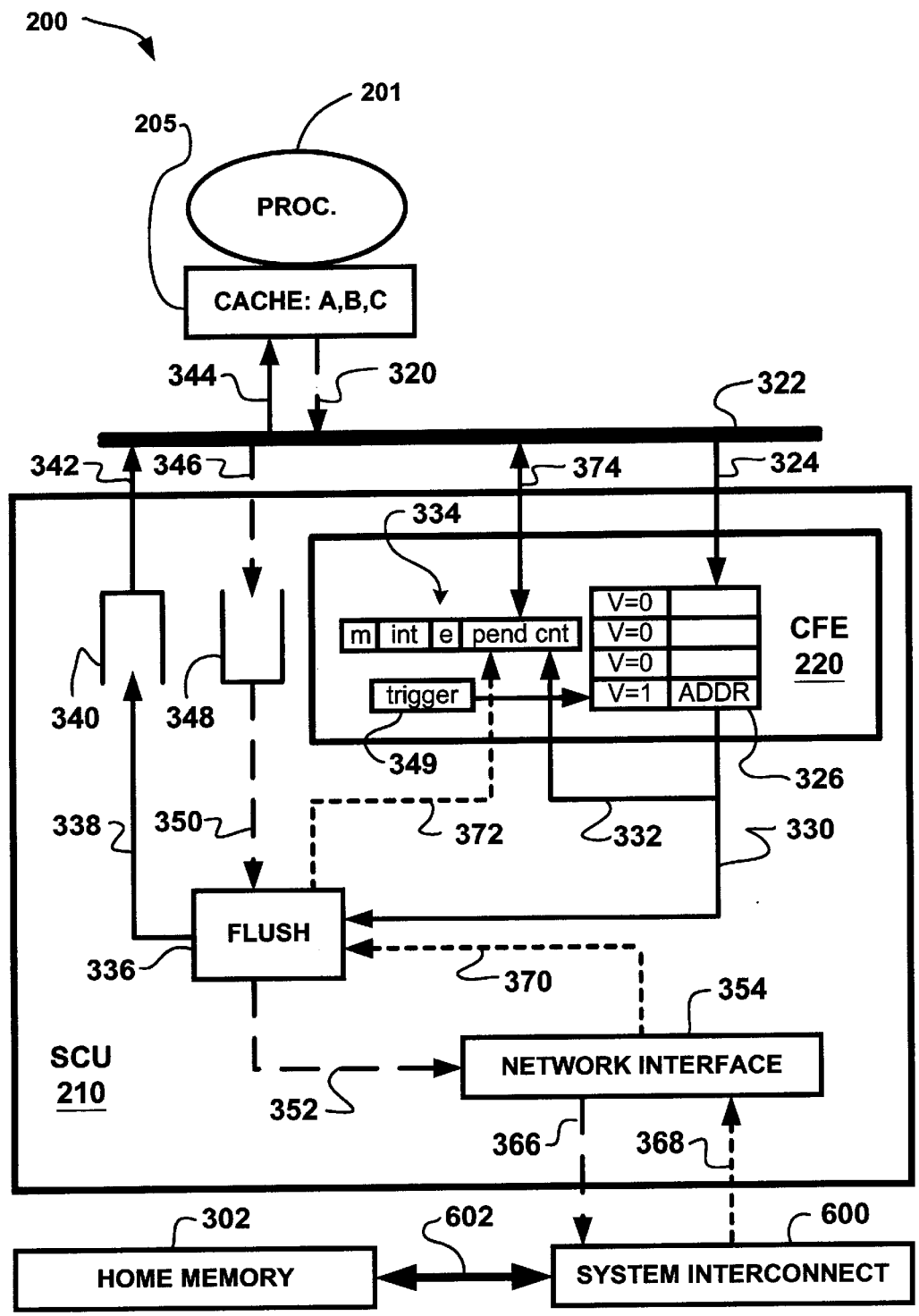
FIG. 2 is a functional block diagram of a cache-flushing engine according to the present invention.

Referring now to FIG. 2, therein is shown the node 200 with the processor 201 and its cache 205. The cache 205 contains a number of memory locations, for example, A, B, and C which contain a series of values, as will later be described. The cache 205 is operatively connected to a node bus 322 which transmits signals to and from the cache 205 to the SCU 210. The SCU 210 is shown operatively connected to the interconnect 600 and the home memory 302 which is in node 300.

Also shown in the SCU 210, by a functional block diagram, are a hardware cache-flushing engine (CFE) 220 and its related elements according to the present invention. Every SCU has a CFE, which is selectively programmable to flush dirty cache lines, or lines with stale data, as will later be explained.

The cache 205 is operatively connected by a memory mapped CFE port 324 to the core logic which is a CFE queue 326 in the CFE 220. The CFE queue 326 is non-blocking and stateless, and is a bookkeeping structure to keep track of all the addresses (ADDR) of the cache line to be flushed and the addresses which are valid as indicated by a bit in the V bit field. Reads to CFE port 324 will return zero if the CFE queue 326 is not ready to accept new requests. In contrast, a non-zero value means that a new request can be issued. To post a request, the software must issue a write to CFE port 324 with the cache line address to be flushed. As soon as the request is en-queued, the valid bit is set.

The CFE queue 326 is operatively connected to provide a "launch request" 330 which also provides an increment signal 332 to a control and status register (CSR) 334. When a request is launched, the corresponding entry is de-queued. The CSR 334 is further operatively connected to the CFE queue 326 to control its mode of operation as will later be described.

The CSR 334 has four fields. The "m" bit is the programmable mode bit, which describes the execution mode. When the mode bit is not set, the CFE fires the flushing request as soon as the request is received (on-the-fly mode). If the mode bit is set, the CFE queue 326 will collect all the requests until a specific trigger command is given. The "int" bit is an interrupt-enable bit. By setting up the "int" field, an interrupt will be generated at the completion of all prior issued requests. The "e" field contains the ORed logic value of all the valid bits of the CFE queue 326. The "pend cnt" field indicates how many flushing operations have been issued to the interconnect 600 and how many are yet to be acknowledged as being completed. The "e" and "pending cnt" fields are both read-only. Writing to the CSR 334 does not change the content of these two fields. The "m" and "int" readable and writeable.

The "launch request" 330 is directly provided to a "flush" state machine 336 which is operatively connected to the CFE queue 326, the CSRT 334, the cache 205, and the home memory 302. The "flush" state machine 336 is a timing control mechanism and is often referred to as third coherence engine which detects sequential inputs and initiates required actions. The "flush" state machine outputs a "flush" signal 338 to a "request" queue 340 where the request is stored until access to the bus 322 is arbitrated. The bus 322 then provides the request signal 344 to the cache 205. The cache 205 provides a flush response 321 to the bus 322 which is then provided as a "request" 346 to the "write-back" queue 348.

From the write-back queue 348 in the SCU 210, the signal is passed as a "write-back" signal 336 to the flush state machine 350 which outputs a "launch flush request" signal on lead 352 to a network interface 354 which is connected to provide an interface to the interconnect 600.

The interconnect 600 communicates with the home memory 302 and provides an "acknowledgement" 368 from the interconnect 600 to the network interface 354. The network interface 354 provides the "acknowledgement" 370 to the "flush" state machine 336. The "flush" state machine 336 then sends a decrement signal 372 to the CSR 334 register "pend cnt". The CSR 334 is polled and set by signals 374 from the node bus 322.

In operation, after a request is posed in the CFE queue, it is launched and serviced by the cache coherence protocol. The protocol starts by issuing a "flush" command, which forces the owner cache to write-back the dirty cache line to be flushed. Subsequently, the cache coherence protocol issues a "flush request" to the home memory of the memory block. The home node will acknowledge when the home memory is successfully updated. Finally, the transaction is complete and the number of pending requests is decremented by one. Specifically, the "pending cnt" field in CFE CSR is decreased by one. After all flush requests are complete, the software may be notified by an interrupt.

An example of operation is provided wherein the cache 205 has three memory locations A, B, and C, each having initial values of zero. First, a lock is placed on the data in all three locations. The lock is an access right to the three locations. The intent of the code is that there is a desire to modify the value of memory locations A, B, and C from zero to one.

The first instruction is write memory location A to one so A goes from zero to one. By doing this operation since it is a cache-based system, so the value will be fetched locally from the memory location in memory 302 and loaded into the cache 205. At this point the new value one is in the cache 205 and the old value zero is in the memory 302.

The second instruction issued is Remember A to program the CFE 220 to remember A so when the commit is given the CFE 220 knows exactly which location to flush out and to reflect into the memory 302. Then the CFE queue 326 is programmed to remember location B. The same thing is done for location C, and then at the commit point, or unlock point, the CFE queue 326 is triggered by a read operation to the CFE trigger 349. Basically the CFE queue 326 then contains the addresses A, B, and C. Once the CFE trigger 349 is triggered, the CFE 220 will look into the CFE queue 326 and determine that there are three addresses A, B, and C, and at that point it will launch the "launch request" 330.

The first request which is launched is to flush location A. The "flush" state machine 336 will start keeping track of the progress. The "flush" state machine 336 will issue the signal for a "flush back" to the node bus 322. After arbitration, by the "request" queue 340, the "flush" will appear on the node bus 322 and the value of A which is equal to one will be flushed out of the local cache 206 and onto the node bus 322. Then the response will be sent back to the "write-back" queue 348 and the "flush" state machine 336. The "flush" state machine 336 will then communicate the "launch flush request" signal 352 to the network interface 354.

The network interface 354 will form a packet, which will have a flush request with A equal to one, and it will flush the value back to the home memory 302. At this point, the home memory 302 has the old value of A equal to zero. Once the home SCU 310 receives the flush request, it will update the home memory 302 and send back the "acknowledgement" 368 to say that the operation is completed. And the message will be sent back through the network interface 354 back to the "flush" state machine 336. The "flush" state machine 336 machine will then complete the sequence of operations for the location A by sending the decrement signal to the "pend cnt" register of the CSR 334. The process will then be repeated for locations B and C. After the acknowledgement for location C has been received back by the SCU 210, the CFE 220 operation will be interrupted until the next flush operation is desired.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. For a multi-processor computer system having a processor with a cache connected thereto and a remote memory, a cache flushing system comprising:
 a cache-flushing engine operatively connected to said cache;
 said cache-flushing engine has a triggering mechanism for starting said cache-flushing engine;
 said cache-flushing engine has a said cache-flushing engine queue mechanism operatively connected to said triggering mechanism and the cache for holding cache information;
 said cache-flushing engine has a control mechanism operatively connected to said cache-flushing engine queue mechanism for controlling and stopping said cache-flushing engine; and
 a timing control mechanism operatively connected to said cache-flushing engine queue mechanism, said control mechanism, the cache, and the remote memory for sequentially flushing information from the cache to the remote memory.

2. The cache flushing system as claimed in claim 1 wherein:
 said cache-flushing engine queue mechanism is capable of containing a plurality of cache memory locations; and
 said cache flushing engine queue mechanism is capable of providing flushing requests.

3. The cache flushing system as claimed in claim 1 wherein:
 said triggering mechanism is operatively connected to and causing said cache-flushing engine queue mechanism to provide the launch request which starts said cache-flushing engine.

4. The cache flushing system as claimed in claim 1 wherein:
 said control mechanism includes a control and status register for maintaining the mode of operation of said cache-flushing engine queue mechanism and stopping the operation thereof when a flush has been acknowledged.

5. The cache flushing system as claimed in claim 1 wherein:
 said timing control mechanism is a state machine responsive to signals from said cache-flushing engine queue mechanism, said control mechanism, the cache, and the remote memory to sequentially provide signals for operation of said cache-flushing engine.

6. The cache flushing system as claimed in claim 1 including:
 a request queue mechanism operatively connected to said cache-flushing engine queue mechanism to arbitrate communications to the cache.

7. The cache flushing system as claimed in claim 1 including:
 a write-back queue mechanism operatively connected to said cache to arbitrate communications from said cache to said timing control mechanism.

8. The cache flushing system as claimed in claim 1 including:
 a network interface operatively connected to said cache to the remote memory for providing packets of memory information therebetween.

9. For a multi-processor computer system having a plurality of processors with a cache, system control units, and memory operatively connected to each of said plurality of processors, a cache flushing system comprising:
 a cache-flushing engine disposed in each of the system control units operatively connected to each of said caches;
 said cache-flushing engine has a triggering mechanism for starting said cache-flushing engine;
 said cache-flushing engine has a said cache-flushing engine queue mechanism operatively connected to said triggering mechanism and the cache for holding cache information;
 said cache-flushing engine has a control and status mechanism operatively connected to said cache-flushing engine queue mechanism for controlling the status and stopping said cache-flushing engine;

a timing control mechanism operatively connected to said cache-flushing engine queue mechanism, said control and status mechanism, the cache, and the remote memory for sequentially flushing information from the cache to a remote memory; and said triggering mechanism responsive to new memory information being provided to said cache-flushing engine queue mechanism to start said cache-flushing engine.

10. The cache flushing system as claimed in claim 9 wherein:

said cache-flushing engine queue mechanism is capable of containing a plurality of local cache memory locations; and said cache-flushing engine queue mechanism is capable of providing flushing requests to a home memory in a memory remote from said cache.

11. The cache flushing system as claimed in claim 9 wherein:

said triggering mechanism is operatively connected to and causing said cache-flushing engine queue mechanism to provide the launch request which starts said cache-flushing engine to provide cache memory information to a home memory in a memory remote from said cache.

12. The cache flushing system as claimed in claim 9 wherein:

said control mechanism includes a control and status register for maintaining the mode of operation of said cache-flushing engine queue mechanism and stopping the operation thereof when a flush has been acknowledged by a home system control unit remote from said cache-flushing engine queue mechanism.

13. The cache flushing system as claimed in claim 9 wherein:

said timing control mechanism is a state machine responsive to signals from said cache-flushing engine queue mechanism, said control mechanism, the cache, and the remote memory to sequentially provide signals for operation of said cache-flushing engine.

14. The cache flushing system as claimed in claim 9 including:

a request queue mechanism operatively connected to said cache-flushing engine queue mechanism to arbitrate communications to the cache.

15. The cache flushing system as claimed in claim 9 including:

a write-back queue mechanism operatively connected to said cache to arbitrate communications from said cache to said timing control mechanism.

16. The cache flushing system as claimed in claim 9 including:

a network interface operatively connected to said cache to the remote memory for providing packets of memory information therebetween.

* * * * *